(12) United States Patent
Kriegel

(10) Patent No.: US 9,287,938 B2
(45) Date of Patent: Mar. 15, 2016

(54) METHOD AND APPARATUS FOR TRANSMISSION OF SONG IDENTIFICATIONS

(71) Applicant: Volkswagen AG, Wolfsburg (DE)

(72) Inventor: Dieter Kriegel, Adenbuettel (DE)

(73) Assignee: Volkswagen AG, Wolfsburg (DE)

( * ) Notice: Subject to any disclaimer, the term of this patent is extended or adjusted under 35 U.S.C. 154(b) by 230 days.

(21) Appl. No.: 13/754,385

(22) Filed: Jan. 30, 2013

(65) Prior Publication Data

US 2013/0142354 A1    Jun. 6, 2013

Related U.S. Application Data

(63) Continuation of application No. PCT/EP2011/003675, filed on Jul. 22, 2011.

(30) Foreign Application Priority Data

Jul. 30, 2010  (DE) .......................... 10 2010 032 735

(51) Int. Cl.

| | | |
|---|---|---|
| *H04B 7/005* | (2006.01) | |
| *H04H 60/74* | (2008.01) | |
| *H04H 20/08* | (2008.01) | |
| *H04H 20/62* | (2008.01) | |
| *H04H 60/92* | (2008.01) | |

(52) U.S. Cl.
CPC ............... *H04B 7/005* (2013.01); *H04H 60/74* (2013.01); *H04H 20/08* (2013.01); *H04H 20/62* (2013.01); *H04H 60/92* (2013.01)

(58) Field of Classification Search
CPC ... H04H 60/74; H04H 2201/13; H04H 20/62; H04H 20/00; H04H 20/08; H04H 60/73; H04H 60/90; H04H 60/92; H04B 7/00; H04B 7/005
USPC ............ 381/86; 700/94; 455/3.01, 3.03, 3.04, 455/3.06
See application file for complete search history.

(56) References Cited

U.S. PATENT DOCUMENTS

| | | | |
|---|---|---|---|
| 6,778,073 B2* | 8/2004 | Lutter et al. ................... | 340/435 |
| 7,739,152 B2* | 6/2010 | Waites ........................ | 705/26.43 |
| 2006/0181982 A1 | 8/2006 | Villevieille et al. | |
| 2007/0142945 A1* | 6/2007 | Beckmann et al. ............. | 700/94 |
| 2009/0061763 A1* | 3/2009 | Dillon et al. .................. | 455/3.05 |

FOREIGN PATENT DOCUMENTS

| | | |
|---|---|---|
| WO | WO 2007/067550 A2 | 6/2007 |
| WO | WO 2008/057987 A1 | 5/2008 |

* cited by examiner

*Primary Examiner* — Vivian Chin
*Assistant Examiner* — Jason R Kurr
(74) *Attorney, Agent, or Firm* — Muncy, Geissler, Olds & Lowe, P.C.

(57) ABSTRACT

A method and an apparatus for the transmission of song identifications from an information/entertainment appliance in a vehicle to one mobile appliance from a plurality of mobile appliances via at least one interface.

10 Claims, 4 Drawing Sheets

| Scenarios<br>x = identified | Mobile device 1 | Mobile device 2 | Mobile device 3 | Mobile device 4 | Type of selection | Selection |
|---|---|---|---|---|---|---|
| | Preset for song transmission | Preset for song transmission | | | | |
| Scenario 1 | x | x | | | Manual | List 1, 2 |
| Scenario 2 | x | | | | Automatic | 1 |
| Scenario 3 | | x | | | Automatic | 2 |
| Scenario 4 | x | | x | x | Automatic | 1 |
| Scenario 5 | | | x | x | Manual | List 3, 4 |
| Scenario 6 | | | x | | Manual | List 3 |
| Scenario 7 | x | x | x | | Manual | List 1, 2, 3 |

FIG. 5

METHOD AND APPARATUS FOR TRANSMISSION OF SONG IDENTIFICATIONS

This nonprovisional application is a continuation of International Application No. PCT/EP2011/003675, which was filed on Jul. 22, 2011, and which claims priority to German Patent Application No. DE 10 2010 032 735.2, which was filed in Germany on Jul. 30, 2010, and which are both herein incorporated by reference.

BACKGROUND OF THE INVENTION

1. Field of the Invention

The invention relates to a method and an apparatus for transmitting song identifiers from an infotainment device in a vehicle to one mobile device from a plurality of mobile devices via at least one interface

2. Description of the Background Art

In the conventional art, song identifiers or metadata for songs (for example, title, artist, album, year, genre) are transmitted by a radio station and received and displayed by a radio and/or provided for further processing, which enables a clear identification of the song. An identifier or metadata can be transmitted, for example, as RDS data. In the case of digital radios, moreover, various metadata can be assigned directly to the broadcast song. Metadata or identifiers can be in the ID3 format or MPEG-4 data container but other formats are also possible. Metadata can be used, for example, to show information about the just played piece, to sort titles in playlists, or to organize archives. Metadata are also designated as a so-called "tag."

If an individual becomes interested in a song being played on the car radio, so that the individual would like to note the title or artist in order to buy the song later or to obtain further information about the title or artist, it is possible to flag this song upon request, whereby the song identifier, the "tag," is stored in a memory of the radio (bookmark function).

When the memory is synchronized with a mobile device, the identifiers are transferred to the mobile device and stored. If the information from the mobile device is linked via a service (e.g., on the Internet) to a database, the display of additional information on the song and simple purchase of the song are made possible.

A system is described in US 2009/0061763 in which a tag is stored in a digital radio receiver. After connection of a mobile device, the data are transmitted directly. A disadvantage here is that no option for controlling the transmission of the song identifiers to different mobile devices is made possible.

SUMMARY OF THE INVENTION

It is therefore an object of the invention to provide a method and apparatus which makes it possible to manage and control a transmission of song identifiers from an infotainment device in a vehicle to one mobile device from a plurality of mobile devices.

In an embodiment, a synchronization process for transmitting stored song identifiers from an infotainment device to at least one mobile device can include the steps of identifying all mobile devices connected and/or connectable via the interface; determining whether a preset for an identified mobile device has been stored that specifies transmission to this mobile device; and transmitting stored song identifiers from the infotainment device automatically, if only a single mobile device with this preset was identified, to this mobile device, after selection of a mobile device from the number of identified mobile devices by a user, when no mobile device with this preset or at least two mobile devices with this preset were identified, to the selected mobile device.

An infotainment device according to an embodiment of the invention can include at least one radio receiver and a memory unit. A radio receiver is particularly suitable for receiving analog and digital broadcasts or is designed as an Internet radio. The memory unit need not be absolutely integrated into the infotainment device, but must only be controllable via the infotainment device to read and write data. The infotainment device can be or is built into a vehicle.

A mobile device according to the invention can be, for example, a mobile phone, a smartphone, a media player, a PDA, or a digital memory. A digital memory according to the invention is particularly a USB data stick and/or an SD card. The mobile device can connect to the Internet either by itself or is used as a data medium to connect to another device by means of which an Internet connection can be made.

The interface between the mobile device and the infotainment device in the vehicle can be made as a cable interface and/or as a wireless interface. An interface can be designed particularly also as an interface to a plurality of devices (media device interface).

A wireless interface can be designed particularly as a radio interface. The radio interface according to the invention is a standard interface, especially according to the Bluetooth standard and/or W-Lan standard, but other radio interfaces as well are expressly included according to the invention. The interface enables data exchange between the mobile device and the infotainment device and can moreover be configured in such a way that the functions on the mobile device can be controlled via the infotainment device.

A mobile device within the meaning of an embodiment of the invention is connected when it is connected via an interface. A connectable mobile device is a mobile device which is located within the range of a wireless connection and is thereby recognized by the interface, and/or a mobile device for which connection data are stored.

The displaying of a possible choice of a mobile device from a plurality of mobile devices according to an embodiment of the invention can occur on the display of the infotainment device and/or on the combination display of the vehicle. A mobile device is selectable via at least one key, particularly within the vehicle, or via speech recognition. A key according to the invention can be a key of the infotainment device and/or a touch screen of the infotainment device and/or a key of a multifunction steering wheel and/or some other key within the vehicle.

Apart from the selection of concurrently available mobile devices, in particular the selection of a sequentially available number of mobile devices is also made possible. If a new device is recognized, the inquiry is made once whether it is to be used for recording the song identifiers. The stored answers are used as presets and can be used to avoid making the inquiry when a previously connected device is recognized.

A song identifier according to the invention can be a clear labeling of a song as metadata and/or a song excerpt from which the entire song can be identified in that the song excerpt is compared with songs in a database. Further, a song identifier can be stored in that the broadcasting station that broadcasts the song being heard currently is stored with the broadcast time.

In another aspect of the invention, the display contains a clear identification of the at least one identified mobile device. The identification can include a name, a number, an image, or other distinguishable features, whereby a combination of different identifications is possible.

In another embodiment, a preset can be stored and/or modified in the vehicle. In another embodiment, the possible choices can be limited as a preset. A limitation of the possible choices can be established for the devices specified by the user, especially for a specific type of mobile devices and/or a specific brand of mobile devices and/or mobile devices for use of specific functions and/or clearly identifiable mobile devices.

In another aspect, it is possible to select a mobile device and/or a plurality of mobile devices as a preset, to which the song identifiers are sent automatically, i.e., without inquiry, as soon as the synchronization process is started. In this regard, for example, the last device which was released to accept the tags by the user can be given this preset. For a previously not released device, an inquiry occurs whether it is to be used. As a further embodiment, only the last released device is recognized and not queried again. As a further embodiment, an indication of the sequence of the mobile devices is possible [to specify] with which device the synchronization is to occur when a plurality of mobile devices is selected in this way and when the thus selected mobile devices are connected and/or connectable concurrently with the infotainment device.

In another embodiment, it is possible that, when a preset is stored for a specific mobile device, no inquiry for the selection of this mobile device is necessary, the song identifiers can be stored directly in this mobile device. This setting can also be controlled via a preset.

The transmission of data, particularly song identifiers, from the infotainment device to the mobile device according to an embodiment of the invention can be made as a synchronization method in that a check is performed whether a song identifier stored in the infotainment device is already stored in the mobile device.

The song identifiers stored in the mobile device can be used, by using a service on the Internet, to display various information on the artist, title, and album, and information provided on the Internet in this context. It is also possible to purchase this song in a simple way.

A system for controlling a transmission of song identifiers from an infotainment device in a vehicle to a mobile device from a plurality of mobile devices can include at least one interface for connecting at least one identified mobile device to the infotainment device via an interface, at least one memory unit for storing song identifiers, a device for identifying the mobile devices connected and/or connectable to the infotainment device via the interface, at least one computer unit for determining whether a preset for an identified mobile device is stored which specifies an automatic transmission to this mobile device, a computer unit for the automatic transmission of song identifiers, at least one device for selection of one mobile device from the number of identified mobile devices by a user, and at least one device for transmitting stored song identifiers from the infotainment device.

A vehicle comprises at least one such system for controlling a transmission of song identifiers from an infotainment device in a vehicle to a mobile device from a plurality of mobile devices.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows different scenarios for identified mobile devices.

DETAILED DESCRIPTION

Figure 1:
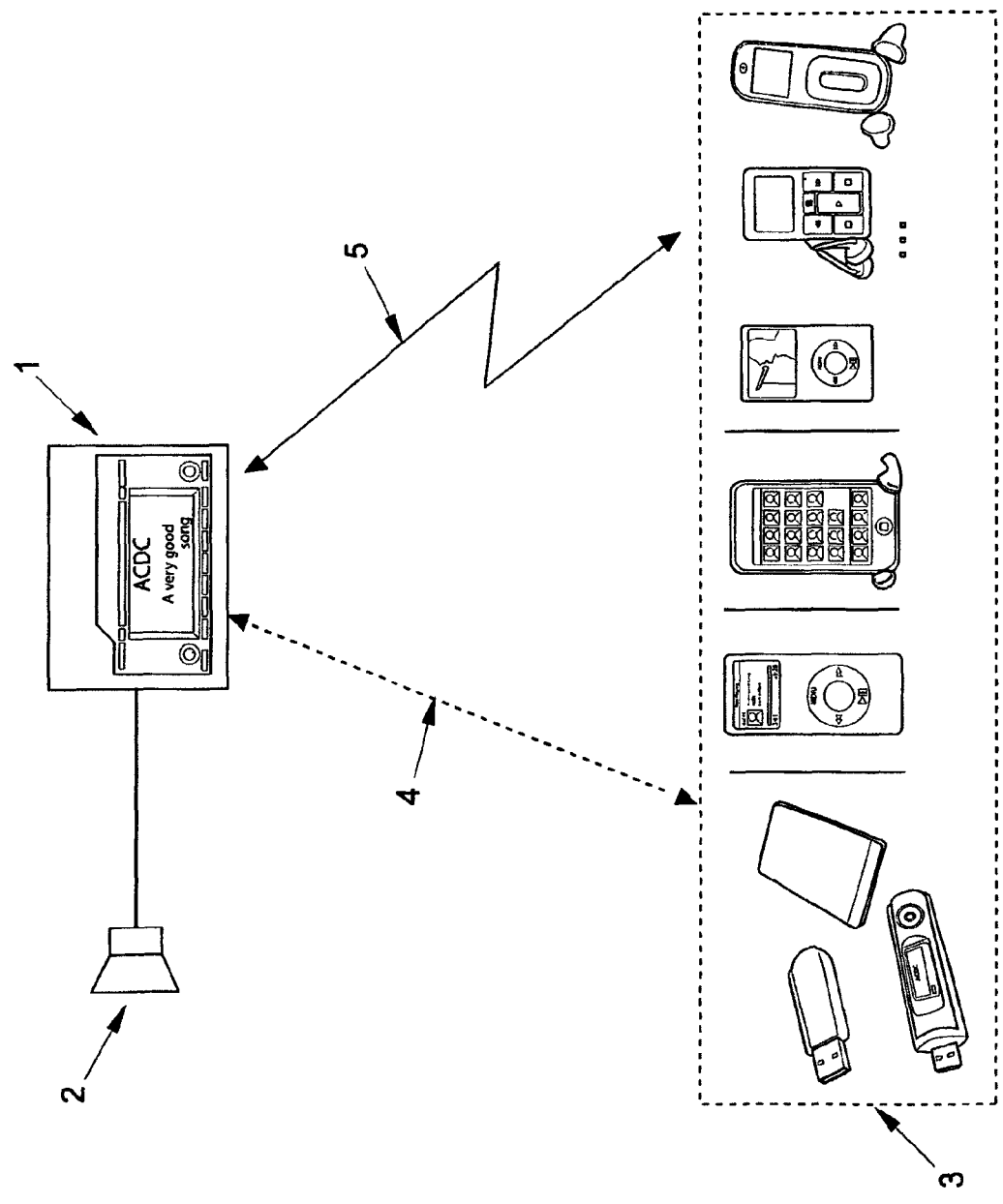
FIG. 1 shows the cable and wireless interfaces between the infotainment device and a plurality of mobile devices.

An infotainment device 1 with a loudspeaker 2 is shown in FIG. 1. The connection of at least one mobile device from a plurality of mobile devices 3 to infotainment device 1 occurs via a wired interface 4 and/or a wireless interface 5. It is possible in this regard that a plurality of mobile devices 3 is connected concurrently to the infotainment device via a wired and/or wireless interface 4, 5.

Figure 2:
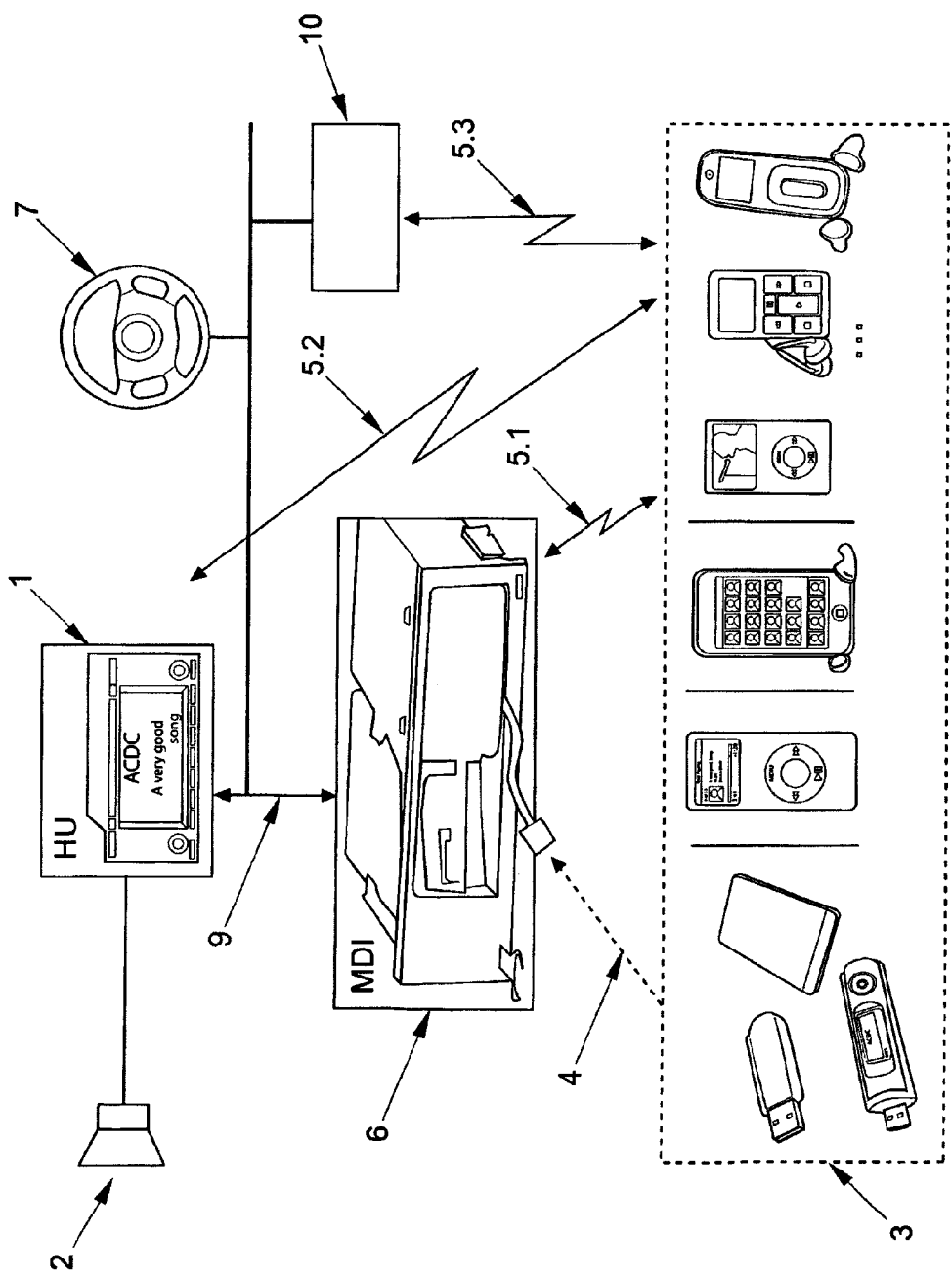
FIG. 2 shows various embodiments of the interfaces.

FIG. 2 shows system 11 for controlling a transmission of song identifiers. This is the connection between infotainment device 1 and at least one mobile device from a plurality of mobile devices 3 by using an interface to a plurality of devices (media device interface—MDI) 6. The MDI in this case is configured in such a way that connections can be made via various devices. A wireless interface 5 in this case can be configured as a wireless connection 5.1 between a mobile device from a plurality of mobile devices 3 and MDI 6 and/or as a wireless connection 5.2 between a mobile device from a plurality of mobile devices 3 and infotainment device 1. A wireless interface 5.3 to a control device 10 is also possible. Further, a multifunction steering wheel 7 is shown which enables selection of the mobile device. The technical data connection between infotainment device 1, MDI 6, the multifunction steering wheel, and/or control device 10 occurs via a data bus 9.

Figure 3:
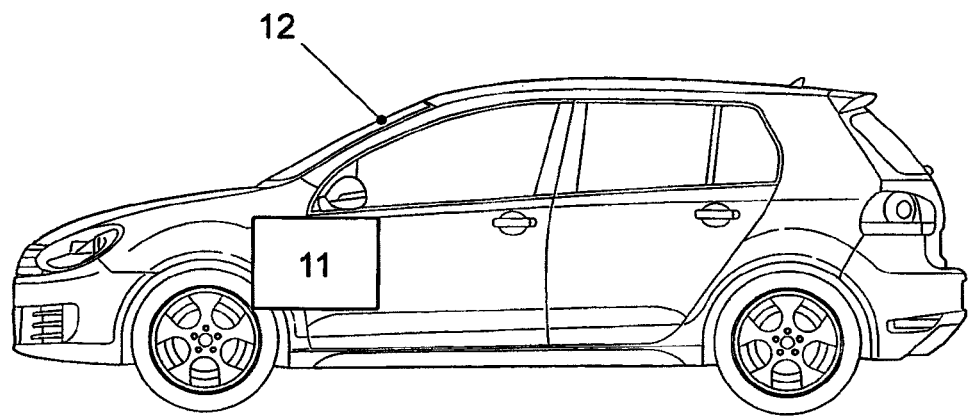
FIG. 3 shows a vehicle with the system.

FIG. 3 shows a vehicle 12 with system 11 for controlling a transmission of song identifiers. System 11 comprises at least all of the elements described in the figure.

Figure 4:
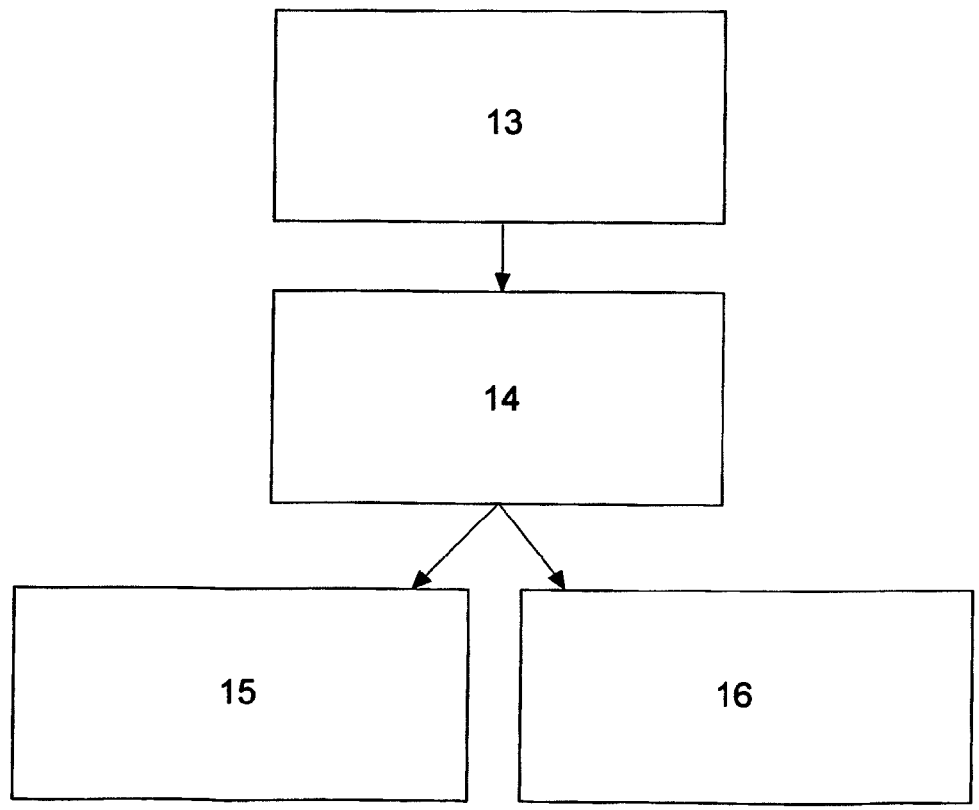
FIG. 4 shows steps of the method.

Steps of the method for transmitting song identifiers from an infotainment device in a vehicle to one mobile device from a plurality of mobile devices via at least one interface are described in FIG. 4. In step 13, all mobile devices connected and/or connectable via the interface are identified. It is determined in step 14 whether a preset for an identified mobile device has been stored that specifies transmission to this mobile device. If only one mobile device with this preset was identified, automatic transmission of stored song identifiers from the infotainment device to this mobile device occurs (step 15). If no mobile device with this preset or at least two mobile devices with this preset were identified, transmission of the stored song identifier from the infotainment device to the selected mobile device occurs after selection of a mobile device from the number of identified mobile devices by a user (step 16).

FIG. 5 shows various scenarios for identified mobile devices. The described preset for a transmission of the song identifiers in the shown example for the mobile devices "mobile device 1" and "mobile device 2" is stored in the memory unit of the infotainment device. No preset is stored for the mobile devices "mobile device 3" and "mobile device 4."

In scenario 1, "mobile device 1" and "mobile device 2" are identified. The user makes a selection of a mobile device from the number of identified mobile devices, namely, "mobile device 1" and "mobile device 2." Only after selection of a mobile device are the song identifiers transmitted to the selected mobile device.

In scenario 2 only "mobile device 1" is identified. An automatic transmission to "mobile device 1" occurs.

In scenario 3 only "mobile device 2" is identified. An automatic transmission to "mobile device 2" occurs.

In scenario 4, "mobile device 1", "mobile device 3," and "mobile device 4" are identified. Because the preset is stored for "mobile device 1" as the only mobile device, automatic transmission to "mobile device 1" occurs.

In scenario 5, "mobile device 3" and "mobile device 4" are identified. The user makes a selection of a mobile device from the number of identified mobile devices, namely, "mobile device 3" and "mobile device 4." Only after selection of a mobile device are the song identifiers transmitted to the selected mobile device.

In scenario 6 only "mobile device 3" is identified. The user makes a selection of a mobile device from the number of identified mobile devices, namely, only "mobile device 3." Only after selection of a mobile device are the song identifiers transmitted to the selected mobile device.

In scenario 7, "mobile device 1", "mobile device 2," and "mobile device 3" are identified. The user makes a selection of a mobile device from the number of identified mobile devices, namely, "mobile device 1," "mobile device 2," and "mobile device 3." Only after selection of a mobile device are the song identifiers transmitted to the selected mobile device.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for transmitting song identifiers from an infotainment device in a vehicle to a mobile device from a plurality of mobile devices via at least one interface, the method comprising:
    identifying all mobile devices connected and/or connectable via the interface;
    determining whether a preset for an identified mobile device has been stored that specifies transmission to the identified mobile device; and
    transmitting stored song identifiers from the infotainment device,
    wherein if the identified mobile devices include only a single mobile device with this preset, the song identifiers are transmitted automatically to this mobile device, and
    wherein, if the identified mobile devices include only a mobile device for which this preset has not been stored or at least two mobile devices with this preset, the song identifiers are transmitted to a selected mobile device after a mobile device is selected from the plurality of identified mobile devices by a user.

2. The method according to claim 1, wherein the transmission of the song identifiers from the infotainment device to a mobile device is not carried out.

3. The method according to claim 1, wherein the identified mobile devices are displayed on a display of an infotainment device and/or a combination instrument of the vehicle.

4. The method according to claim 1, wherein the identified mobile devices, for which a preset is stored that specifies an automatic transmission to this mobile device, is displayed highlighted.

5. The method according to claim 1, wherein the mobile device is selected via at least one key within the vehicle or via speech recognition.

6. The method according to claim 1, wherein a clear identification of the at least one identified mobile device is displayed on the display.

7. The method according to claim 1, wherein the preset for a mobile device is stored and/or modified in the vehicle.

8. The method according to claim 7, wherein the preset is established only for mobile devices specified by the user for a specific type of mobile devices and/or a specific brand of mobile devices and/or mobile devices for using specific functions and/or clearly identifiable mobile devices.

9. A system for controlling a transmission of song identifiers from an infotainment device in a vehicle to a mobile device from a plurality of mobile devices, the system comprising:
    at least one interface configured to connect at least one identified mobile device to the infotainment device;
    at least one memory unit configured to store song identifiers;
    a device configured to identify all mobile devices connected and/or connectable to the infotainment device via the interface; and
    at least one computer unit configured to determine whether a preset for an identified mobile device is stored that specifies an automatic transmission to the identified mobile device;
    wherein, if the identified mobile devices include a single mobile device with this preset, the computer unit automatically transmits the song identifiers to the single mobile device, and
    wherein, if the identified mobile devices include only a mobile device for which this preset has not been stored or at least two mobile devices with this preset, the computer unit transmits the song identifiers to a selected one of the mobile devices after a mobile device is selected from the plurality of the identified mobile devices by a user.

10. A vehicle comprising the system according to claim 9 for controlling a transmission of the song identifiers from the infotainment device in the vehicle to the mobile device from the plurality of mobile devices.

* * * * *